Dec. 25, 1951 G. W. JOHANSEN ET AL 2,580,100
IMPLEMENT RAISING AND LOCKING DEVICE
Filed Aug. 12, 1946 2 SHEETS—SHEET 1
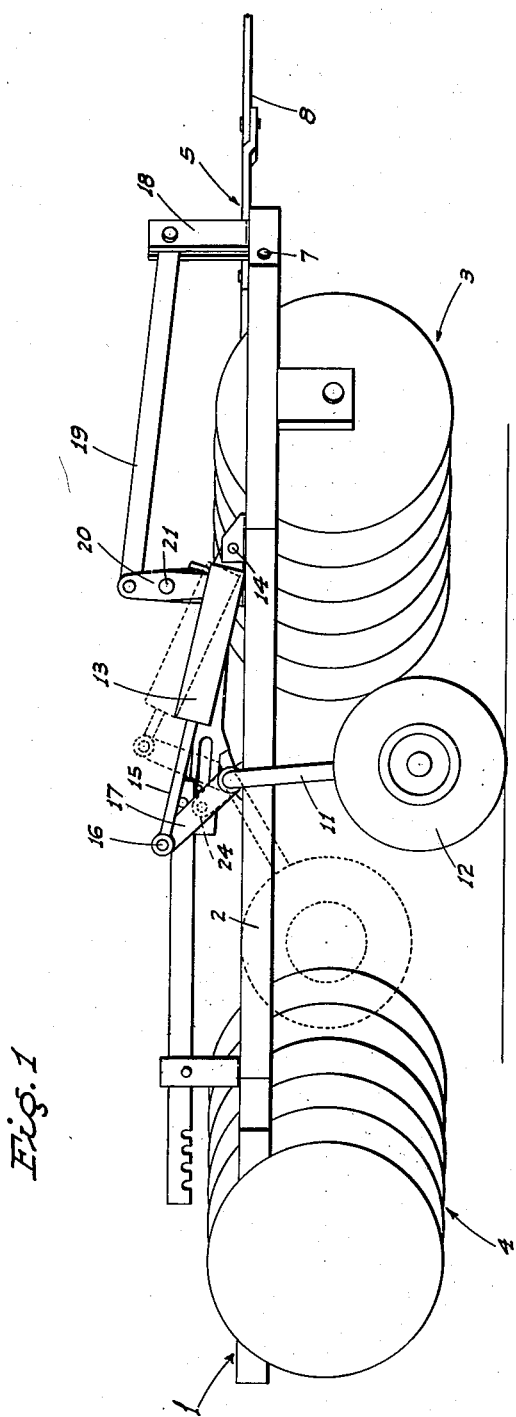
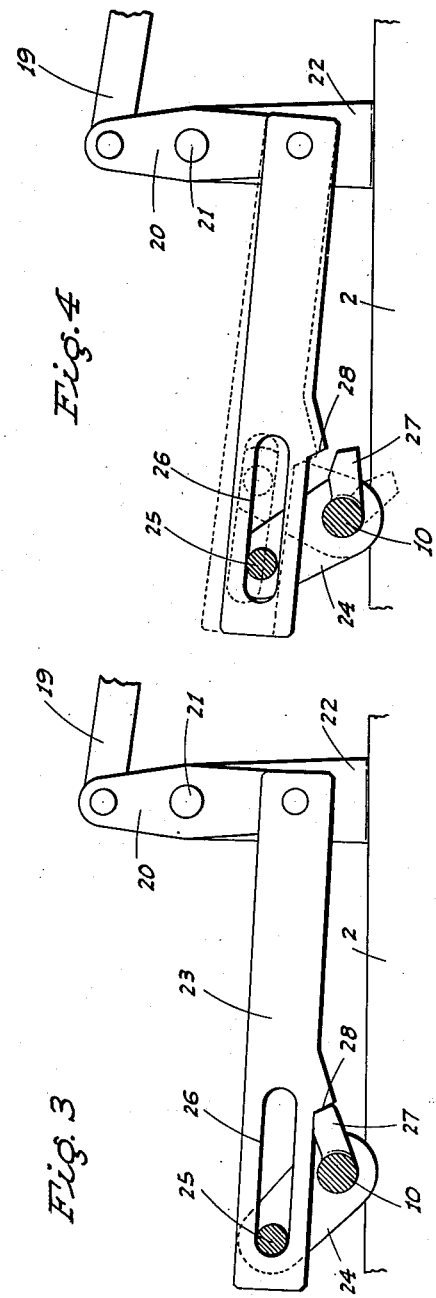
INVENTORS
G. W. Johansen
W. E. Copley
BY
ATTYS Patented Dec. 25, 1951

2,580,100

UNITED STATES PATENT OFFICE 2,580,100

IMPLEMENT RAISING AND LOCKING DEVICE

Gordon W. Johansen and Welford E. Copley, Livingston, Calif.; said Copley assignor to Wayne A. Yocom, Atwater, Calif.

Application August 12, 1946, Serial No. 689,871

5 Claims. (Cl. 55—73)

This invention is directed to, and it is an object to provide, a raising and locking device adapted for use on agricultural implements such as tandem disc harrows.

The device is operative to raise the implement from a lowered working position to a raised inoperative position, and in such latter position to effectively lock the implement and its normally vertically swingable hitch unit against relative buckling in a vertical plane so that the implement does not teeter when raised for turning in a field or for transport from place to place.

Another object of the invention is to provide a device, as above, which includes a power cylinder actuated, wheel lift assembly to raise the implement, and a novel linkage arrangement connected between the lift assembly and the normally vertically swingable hitch unit; said linkage arrangement being operative upon functioning of the lift assembly to then cause the aforesaid locking of the hitch unit.

A further object of the invention is to produce a practical implement raising and locking device, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of a tandem disc gang harrow, of fixed angle type, embodying the novel implement raising and locking device; the harrow being shown in its raised position, with the hitch unit locked.

Fig. 3 is an enlarged, fragmentary sectional elevation of the linkage arrangement which causes locking of the hitch unit relative to the implement; such linkage arrangement being shown in locked position.

Fig. 4 is a similar view, but shows the linkage arrangement unlocked.

Figure 2:
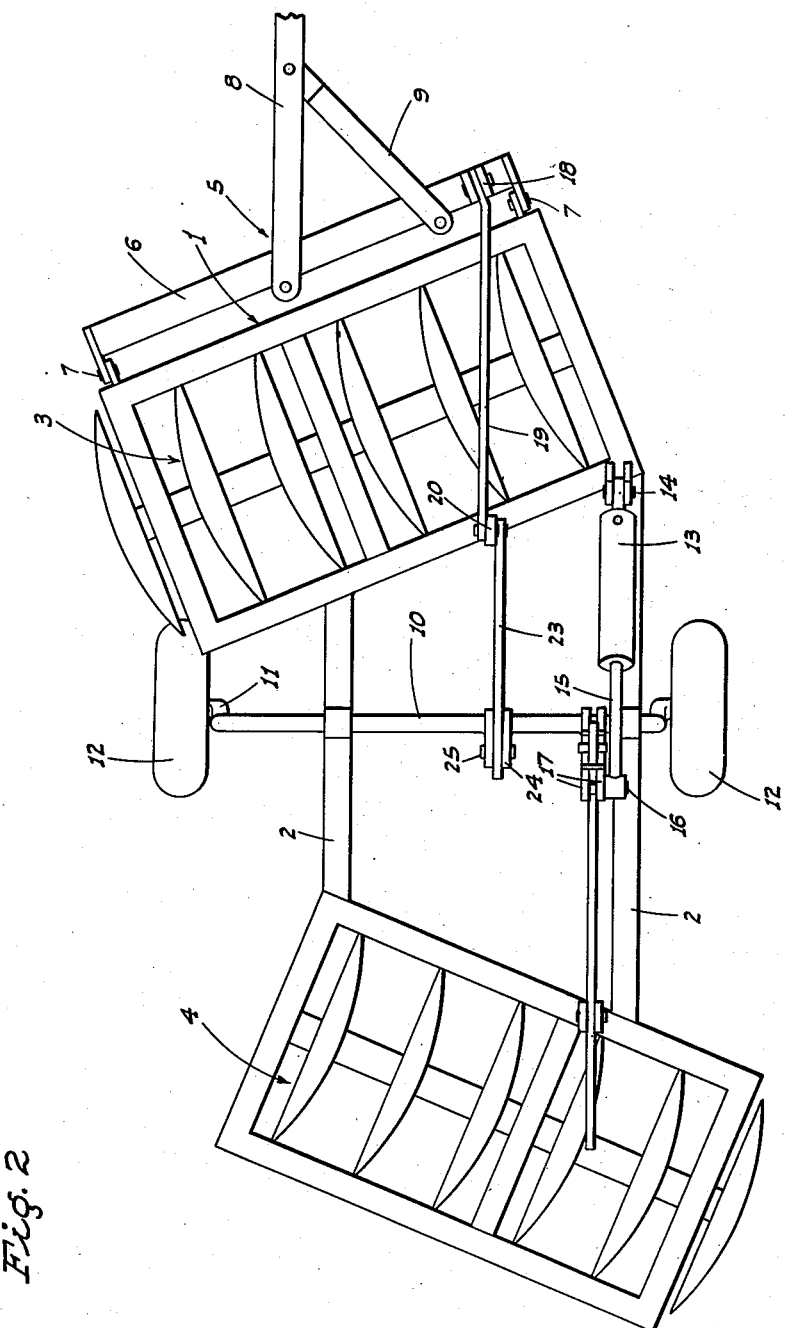
Fig. 2 is a plan view of the implement shown in Fig. 1.

Referring now more particularly to the characters of reference on the drawings, the invention is here shown as embodied in a tandem-disc gang harrow of fixed angle type, which harrow includes a main frame, indicated generally at 1, having transversely spaced longitudinal beams 2 connected between the frame portions which carry the front gang 3 and the rear gang 4. The front and rear gangs 3 and 4 are fixed in angled relation to each other, as shown.

At its forward end the main frame 1 is connected to a hitch unit, indicated generally at 5, which unit is comprised of the following:

A transverse drawbar 6 is disposed ahead of the main frame 1 and is hinged, at opposite ends, in connection with said frame, as at 7, for normal relative vertical swinging movement. A tongue 8 is secured in connection with the drawbar 6 and projects forwardly for coupling to a tractor; a diagonal brace 9 extending between the tongue intermediate its ends and an offset point on the drawbar 6.

The implement is fitted with a wheel lift assembly which comprises a transverse shaft 10 extending between, and journaled in connection with, the beams 2. At opposite ends, and laterally outwardly of the beams 2, the shaft 10 is formed with cranks 11 having wheels 12 turnably mounted on the free ends thereof.

When the shaft 10 is turned to a position with the cranks 11 projecting downwardly, as shown in full lines in Fig. 1, the wheels 12 are relatively lowered and the implement is then in raised, inoperative position. When the shaft 10 is turned to a position with the cranks 11 swung relatively upwardly to the position shown in dotted lines in Fig. 1, the wheels are correspondingly relatively raised and the implement is in lowered working position.

The shaft 10 is rotated to relatively raise or lower the wheels 12, as above described, and by the following means:

A fluid pressure actuated power cylinder 13 is pivoted in connection with the main frame 1 at one side thereof, as at 14, and thence extends at an upward and rearward incline; said cylinder 13 including a rearwardly projecting piston rod 15 pivoted, as at 16, in connection with an upstanding radial lever 17 fixed on the shaft 10. The piston rod 15 is retracted, and the radial lever 17 disposed at a forward end upward slope when the wheels 12 are relatively raised, as shown in dotted lines in Fig. 1, while said piston rod is extended and the lever 17 disposed at an upward and rearward slope when the wheels are in relatively lowered position. The power cylinder 13 is interposed in, and controlled by, a fluid pressure supply system (not shown) which includes an operating valve on the tractor.

Upon operation of the power cylinder 13 to cause relatively lowering of the wheels 12, and raising of the implement to inoperative position, the following described linkage arrangement causes the hinged drawbar 6 to be positively locked against any buckling, in a vertical plane, between said drawbar and the main frame 1:

A rigid post 18 is fixed on, and upstands from, the drawbar 6 adjacent one end thereof, and a longitudinally extending link 19 is pivotally connected between the upper end of the post 18 and the upper end of an upstanding swing lever 20 pivotally mounted, intermediate its ends, as at 21, to an upstanding bracket 22 on the main frame 1 intermediate said drawbar and the shaft 10.

Another longitudinal link 23 is pivotally connected, at its forward end, to the lower end of the swing lever 20 and thence extends rearwardly in overhanging relation to the shaft 10; the rear end portion of the link 23 extending between a pair of matching radial levers 24 fixed on the shaft 10 in adjacent relation. The levers 24 extend at a forward and upward slope when the wheels are raised, and at a rearward and upward slope when the wheels are lowered. A cross pin 25 extends between the outer ends of the radial levers 24 and rides in a longitudinal slot 26 cut in the adjacent end portion of the link 23.

A dog 27 is fixed on, and projects forwardly from, the shaft 10 in direct vertical alinement below the link 23; the latter including a rearwardly facing shoulder 28 formed for cooperative engagement with the dog 27, but normally being free thereof.

When the shaft 10 is rotated by the power cylinder 13 to swing the cranks 11 and wheels 12 downwardly, so as to raise the implement, the cross pin 25 moves rearwardly into the rear end of the slot 26, and at the same time the dog 27 swings upwardly into close engagement with the locking shoulder 28. With the cross pin 25 thus bearing rearwardly against the link 23, and the dog 27 bearing forwardly against the shoulder 28, the link 23 is positively held against longitudinal movement. This results, through the medium of the swing lever 20, link 19, and post 18, in locking the drawbar 6 against any swinging motion in a vertical plane relative to the main frame 1. As a consequence, the implement, when in raised position, cannot have any teetering action relative to the hitch unit 5, which is very advantageous when the implement is raised for turning in the field, or for transport from place to place.

It should be noted that by reason of the arrangement of cross pin 25 and slot 26 that when the wheels are raised and the implement is in lowered working position, the drawbar 6 may float up and down, as is desirable; the resulting motion through post 18, link 19, swing lever 20, and longitudinal link 23 being free, for the reason that the cross pin 25 is then disposed intermediate the ends of said slot 26.

From the foregoing description it will be readily seen that there has been produced such a device as substantially fulfills the objects of the invention, as set forth in this specification.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A raising and locking device for an implement which includes a hitch unit pivotally mounted thereon for relative vertical swinging movement, said device comprising a power actuated lift assembly on the implement operative to raise or lower the same, said lift assembly including a power rotated, transversely extending shaft, a radial lever on the shaft, a linkage arrangement including a link extending forwardly from adjacent the radial lever, there being a cross pin on the radial lever and the adjacent part of the link having an elongated slot in which the pin rides, said linkage arrangement extending to connection with the hitch unit, said relative vertical swinging movement of the hitch unit being effected only with a resultant motion of the linkage arrangement, and a radial dog on the shaft, said link having a longitudinally facing shoulder against which the dog bears when the cross pin, upon rotation of the shaft to raise the implement, is in the end of the slot opposed to said shoulder, whereby to then lock the link and linkage assembly against motion.

2. A raising and locking device for an implement which includes a hitch unit pivotally mounted thereon for relative vertical swinging movement, said device comprising a wheel lift assembly on the implement operative to raise or lower the same, said assembly including a cross shaft reversibly rotatable to relatively raise or lower the wheels and power means to so rotate the shaft, a post upstanding from the hitch unit, a link pivoted to and extending rearward from the post, and means connected between the shaft and link operative to lock the link against longitudinal movement when the shaft is rotated to lower the wheels.

3. A raising and locking device for an implement which includes a hitch unit pivotally mounted thereon for relative vertical swinging movement, said device comprising a transverse shaft on the implement, parallel cranks on the ends of the shaft, wheels on the cranks, a radial lever on the shaft, a power cylinder connected to the radial lever operative to reversibly rotate the shaft to relatively raise or lower the wheels, another radial lever on the shaft, a cross pin on said other radial lever, a longitudinal link projecting forwardly from adjacent the other radial lever, the latter having an elongated slot in which the cross pin rides, a swing lever pivoted intermediate its ends on the implement, the link being pivoted at its forward end to one end of the swing lever, another longitudinal link pivoted to the other end of the swing lever and projecting forwardly, a post upstanding from the hitch unit, said other link being pivoted to the post, the cross pin engaging one end of the slot when the shaft is rotated to lower the wheels, there being a shoulder on said slotted link in opposed relation to said one end of the slot, and a radial dog on the shaft adapted to bear against said shoulder when the cross pin is engaged with said one end of the slot.

4. In combination with an implement which includes a main frame and a hitch unit pivotally connected with said main frame for relative vertical swinging movement, a cross shaft journaled on the main frame, crank arms on the shaft, wheels mounted on the crank arms and operative upon rotation of the shaft to engage the ground and lift the frame, power means connected with the shaft and operative to selectively rotate the same, and latch means separate from the power means and inter-connected between the hitch unit and the shaft and effective to lock the hitch unit against said relative vertical swinging movement when the wheels are engaged with the ground, said latch means including an upstanding swing lever mounted on the main frame, a rigid link pivotally interconnected between one end of the swing lever and the hitch unit, a second link pivotally connected at one end to the opposite end of the swing lever, a shoulder on the second link adjacent its free end, and a dog on the shaft engageable with the shoulder when the shaft is turned to cause the wheels to engage the ground.

5. A combination as in claim 4 and including therewith a radial lever on the shaft, and a pin on the free end of the lever, the second link being provided with a longitudinal slot, said pin projecting into said slot and engaging the outer end thereof when the wheels are in engagement with the ground.

GORDON W. JOHANSEN.
WELFORD E. COPLEY.

REFERENCES CITED

The following references are of record in the file of this patent:

UNITED STATES PATENTS

| Number | Name | Date |
|---|---|---|
| 2,209,312 | Rapp | July 30, 1940 |
| 2,320,742 | Newkirk | June 1, 1943 |
| 2,458,091 | Moore | Jan. 4, 1949 |